Patented Aug. 28, 1928.

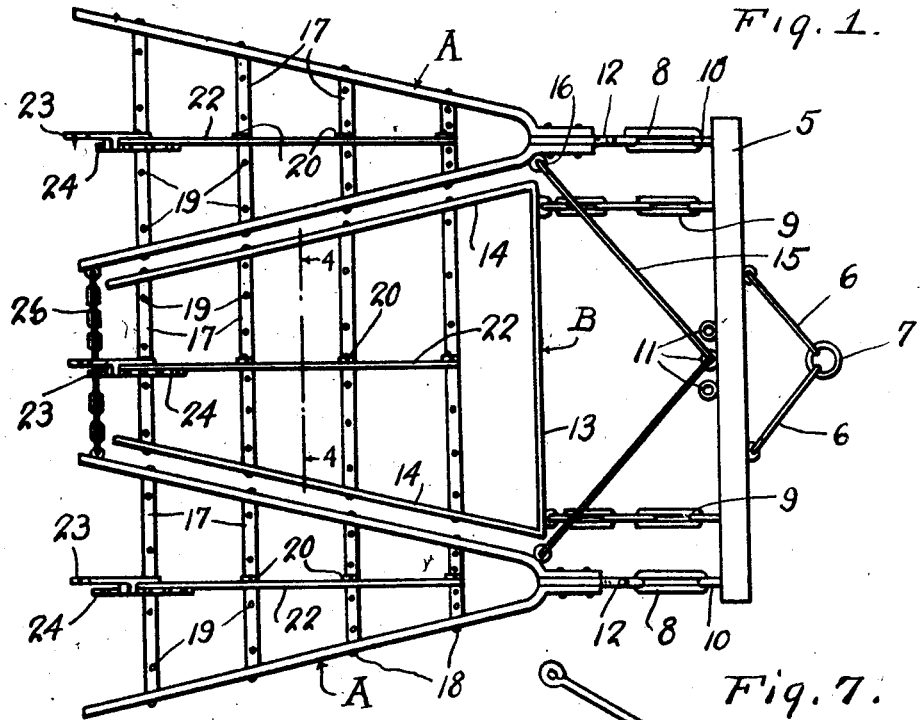
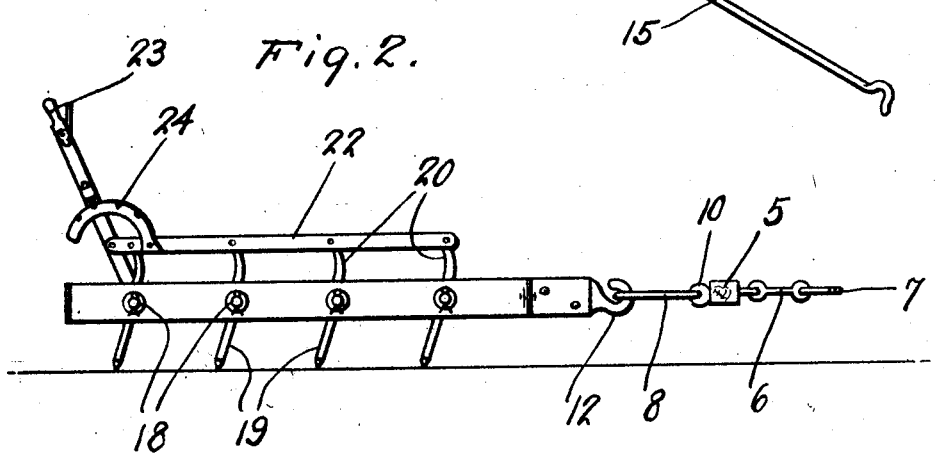

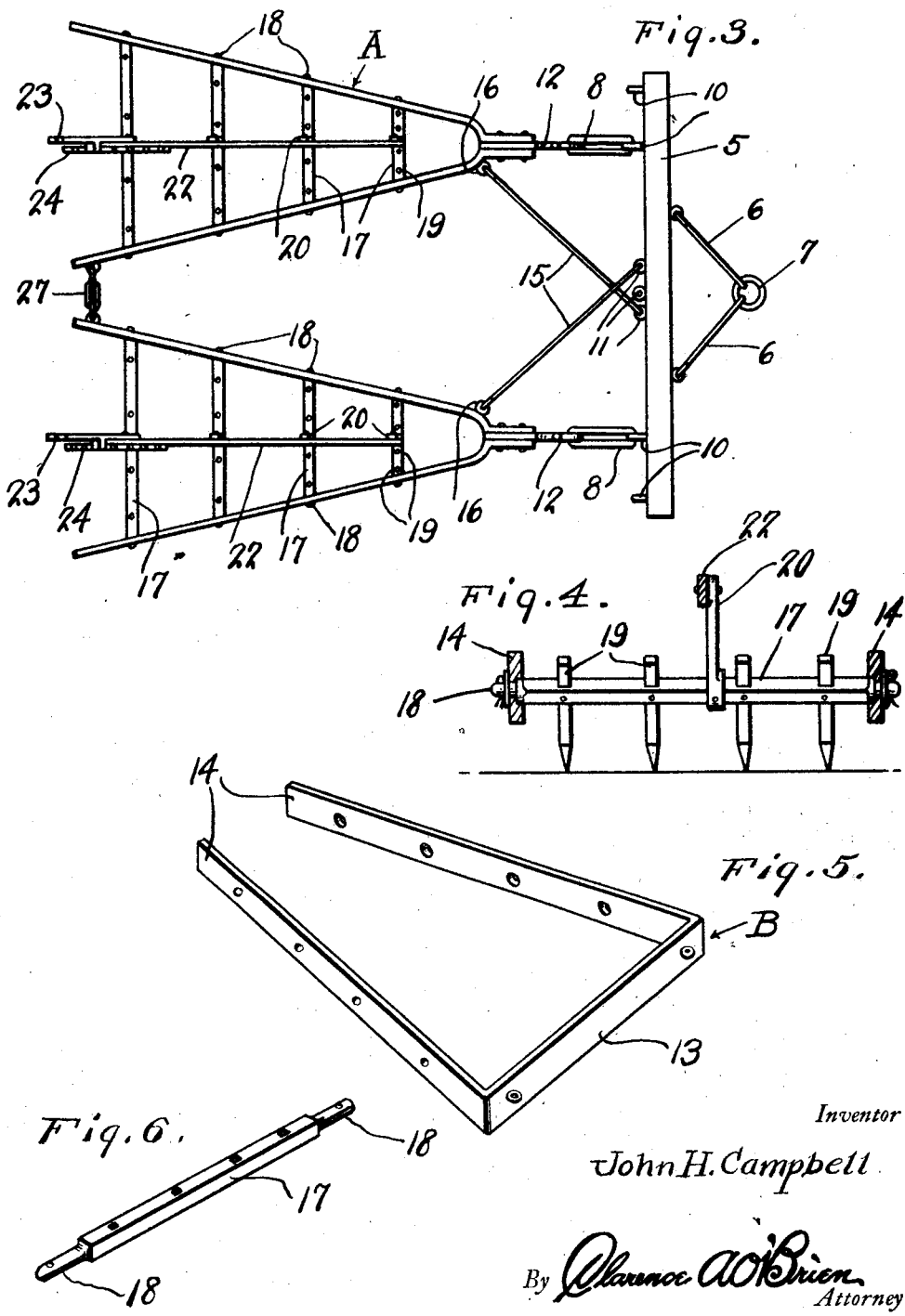

1,682,322

UNITED STATES PATENT OFFICE.

JOHN H. CAMPBELL, OF FRANKFORT, KANSAS.

LISTER CORN HARROW.

Application filed June 2, 1927. Serial No. 196,026.

The present invention relates to a lister harrow designed particularly for harrowing corn, and aims to provide a structure which is thoroughly reliable and efficient in cultivating the soil by the use of its improved harrow structure, breaking up and crushing and destroying small weeds.

Another very important object of the invention lies in the provision of a harrow which may be used to harrow listed corn before and after it comes up.

Another very important object of the invention resides in the provision of a device of this nature wherein the teeth of the harrow can be quickly and easily adjusted to any desired angle, by the use of convenient levers.

With the above and numerous other objects in view, as will appear as the description proceeds, the invention resides in certain novel features of construction, and in the combination and arrangement of parts as will be hereinafter more fully described and claimed.

In the drawing:

Figure 1 is a top plan view of the harrow embodying the features of my invention.

Figure 2 is a side elevation thereof.

Figure 3 is another top plan view showing one section removed.

Figure 4 is a transverse vertical section taken substantially on the line 4—4 of Figure 1.

Figure 5 is a perspective view of one of the frames.

Figure 6 is a perspective view of one of the cross bars, and

Figure 7 is a perspective view of one of the hook rods.

Referring to the drawing in detail, it will be seen that the numeral 5 denotes a cross beam having links 6 attached to the forward edge thereof to hold the clevis ring 7. On the rear edge there are mounted links 8 and 9 on eyes 10. Three eyes 11 are mounted at the center of the cross beam. A pair of frames A are substantially V-shaped in formation and at their apices have hooks 12 engageable with either links 8 or chains 9. The letter B denotes a center frame adapted to be disposed between the frames A and is of a substantially U-shaped formation having a cross bar 13 forming the bight of the U, and legs 14 extending from the bight at an acute angle thereto and therefore diverging toward each other, toward their extremities. The frames A are braced by hook rods 15, which are engaged adjacent the apices thereof by eyes 16. In the assembly shown in Figure 1, these brace hooks engage the center eye 11.

The frames A and B are each provided with a plurality of cross bars 17, having rounded ends 18 journaled in the sides of the respective frames. A plurality of harrow teeth 19 are mounted in each bar 17. Cranks 20 are attached to the bars 17 and each frame, and the cranks of each frame are connected to a rod 22. On the rearmost bar 17 of each frame is rockably mounted a lever 23 having a detent for engaging a notched quadrant 24 on the rod 22, whereby the teeth may be held at different desired angles.

As is shown to advantage in Figure 3, the center frame B may be left off and the chains or links 8 engaged with the inner eyes 10. The hook rods 15 are disposed so as to cross each other, and are engaged in the end eyes 11. In Figure 1, the frames A have their rear ends connected by the cross chain 26, while in Figure 3 they are connected by a shorter cross chain 27. The device is used in Figure 1 to harrow the ground before the corn is planted, while in Figure 3, the harrow is used for listed corn.

It is thought that the construction, utility and advantages of this invention will now be quite apparent to those skilled in this art, without a more detailed description thereof. The present embodiment of the invention has been disclosed in detail merely by way of example, since in actual practice it attains the features of advantage enumerated as desirable in the statement of the invention and the above description.

It will be apparent that changes in the details of construction, and in the combination and arrangement of parts may be resorted to, without departing from the spirit or scope of the invention as hereinafter claimed or sacrificing any of its advantages.

Having thus described my invention, what I claim as new is:

A harrow of the class described comprising a cross beam, a pair of V-shaped frames, a U-shaped frame disposed between the V-shaped frames, links engaged with the apices of the V-shaped frame and engaged with the cross beam at spaced points, rods pivotally engaged with the apices of the V-shaped frames and the center of the beam, said U-shaped frame having its sides converging rearwardly toward each other, chains connecting the bight portion of the U-shaped frame with the cross beam, said U-shaped frame being shorter than either of said V-shaped frames, and a chain connecting the extremities of the inner legs of the V-shaped frames and extending across the rear of the U-shaped frame.

In testimony whereof I affix my signature.

JOHN H. CAMPBELL.